United States Patent [19]

Eidenmüller

[11] Patent Number: 5,785,422
[45] Date of Patent: Jul. 28, 1998

[54] PISTON ARRANGEMENT FOR REMOVING A REACTIVE PLASTIC MIXTURE FROM A STABILIZING CHAMBER OF A MIXING DEVICE

[75] Inventor: Siegfried Eidenmüller, Ramelsbach, Germany

[73] Assignee: Krauss-Maffei AG, Munich, Germany

[21] Appl. No.: 750,686

[22] PCT Filed: Mar. 8, 1996

[86] PCT No.: PCT/EP96/00988

§ 371 Date: Dec. 17, 1996

§ 102(e) Date: Dec. 17, 1996

[87] PCT Pub. No.: WO96/33852

PCT Pub. Date: Oct. 31, 1996

[30] Foreign Application Priority Data

Apr. 24, 1995 [DE] Germany ............... 195 15 039.2

[51] Int. Cl.⁶ ............................ B01F 5/04; B29B 7/76
[52] U.S. Cl. ........................... 366/162.5; 422/133
[58] Field of Search .......................... 366/136–138, 366/159.1, 162.4, 162.5; 422/133–135

[56] References Cited

U.S. PATENT DOCUMENTS

| 3,189,325 | 6/1965 | Levy. | |
|---|---|---|---|
| 4,279,517 | 7/1981 | Wallner et al. | 366/159.1 |
| 4,497,579 | 2/1985 | Schmitz et al. | 366/159.1 X |
| 4,503,014 | 3/1985 | Bauer | 366/162.5 X |
| 4,510,120 | 4/1985 | Bauer | 422/133 |
| 4,592,657 | 6/1986 | Taubenmann | 366/162.4 X |

FOREIGN PATENT DOCUMENTS

| 2060566 | 8/1992 | Canada | 366/162.5 |
|---|---|---|---|
| 0 009 114 | 4/1980 | European Pat. Off. . | |
| 0 257 221 | 3/1988 | European Pat. Off. . | |
| 0 451 921 A1 | 10/1991 | European Pat. Off. . | |
| 31 08 636 | 9/1982 | Germany. | |
| 89 15 329 | 4/1990 | Germany. | |

Primary Examiner—Charles E. Cooley
Attorney, Agent, or Firm—Henry M. Feiereisen

[57] ABSTRACT

A device for mixing at least two chemically reactive plastic components, includes a cylindrical mixing chamber into which plastic components are injected, wherein a reversible piston is disposed inside the mixing chamber, and a cylindrical stabilizing chamber adjoining the mixing chamber and positioned at an angle of preferably 90°, with a reversible cleaning piston disposed inside the stabilizing chamber for removing the reactive plastic mixture from the stabilizing chamber. In order to reduce the forces exerted on the cleaning piston by the plastic mixture and to reduce the tear-off forces on a stuck piston to a minimum, it is proposed to form on the cylindrical surface area of the cleaning piston indentations which are filled with spacer material and arranged in a manner that the cleaning piston executes a rotational motion when it moves axially.

11 Claims, 1 Drawing Sheet

PISTON ARRANGEMENT FOR REMOVING A REACTIVE PLASTIC MIXTURE FROM A STABILIZING CHAMBER OF A MIXING DEVICE

BACKGROUND OF THE INVENTION

The invention relates to a device for mixing at least two chemically reactive plastic components, and in particular to a mixing device of a type having a cylindrical mixing chamber for receiving injected plastic components and having disposed therein a reversible piston for removing remaining plastic mixture, and a cylindrical stabilizing chamber adjoining the mixing chamber and positioned at an angle of preferably 90° relative to the longitudinal axis of the mixing chamber, with a reversible cleaning piston disposed inside the stabilizing chamber for removing the reactive plastic mixture from the stabilizing chamber.

A device of this type is known from the German utility model G 89 15 329 where the cleaning piston has a sealing ring disposed in a circular channel. With this sealing ring, the surface of the stabilizing chamber can be cleaned well, but it cannot be ruled out that fully reacted plastic material enters between the surface of the stabilizing chamber and the surface of the cleaning piston and leads to sticking of the cleaning piston. In the same manner, especially an uneven distribution of the reacted plastic material may lead to a dangerous situation where the piston and the cylinder tube come into metallic contact and seize.

It is already known from DE-AS 28 38 798 to place indentations on the piston controlling the supply of the plastic components in order to prevent seizing of the control piston, wherein fully reacted material in the indentations is supposed to prevent metallic contact between the piston and the cylinder wall. It is, however, difficult to dislodge the piston by this method alone when it is stuck in the cylinder wall, so that, in this case, strong tear-off forces may be required which could lead to damage or breaking or tearing of the cleaning piston.

SUMMARY OF THE INVENTION

It is the object of the invention to reduce the tendency of a cleaning piston of the aforedescribed type to become stuck and to reduce the tear-off forces.

The invention is based on the realization that when spacer material is applied to the cleaning piston in a spiral-shaped pattern, the potentially stuck surface is, on one hand, reduced and the gap between the piston and the cylinder tube, on the other hand, is not capable of being unevenly coated with sticking fully reacted plastic material. This eliminates the danger that the piston comes into metallic contact with the cylinder tube as a result of one-sided radial pushing. Especially, however, the introduction of a rotational motion results in a shear force component which is oriented transversely to the axial piston stroke, whereby sticky materials remaining between the piston and the cylinder tube can be particularly effectively dislodged. The additional advantage is that new surface areas of the piston and the cylinder face each other every time as a result of the rotation of the cleaning piston, so that the formation of striations and deposits extending in a axial direction is positively eliminated.

Fully reacted plastic material is preferably employed as spacer material. This material is formed when the not yet fully reacted plastic mixture seeps into the gap between the piston and the cylinder tube. The plastic mixture settles in the indentations and provides—as the result of the swelling associated with the complete reaction—a securely maintained gap which prevents metallic contact between a piston and the cylinder surface.

In principle, it is also possible to introduce other materials into the indentations other than a fully reacted plastic mixture, before the cleaning piston is installed. Suitable for this purpose may be sealing materials which not only do not tend to stick with respect to the plastic mixture to be processed, but—because of their strongly repellent effect—also rule out sticking in the regions immediately adjacent to the sealing material.

In a preferred embodiment, the cleaning piston is freely rotatably secured to the piston rod of the hydraulic piston, whereby the torque created by the spiral-shaped arrangement of the indentations, in particular, can efficiently affect any sticking regions. In this way, friction losses due to rotation at the sealing regions of the piston rod and the hydraulic piston are eliminated.

BRIEF DESCRIPTION OF THE DRAWINGS

The invention is described hereinafter with reference to the drawing, in which.

DETAILED DESCRIPTION OF PREFERRED EMBODIMENTS

Figure 1:
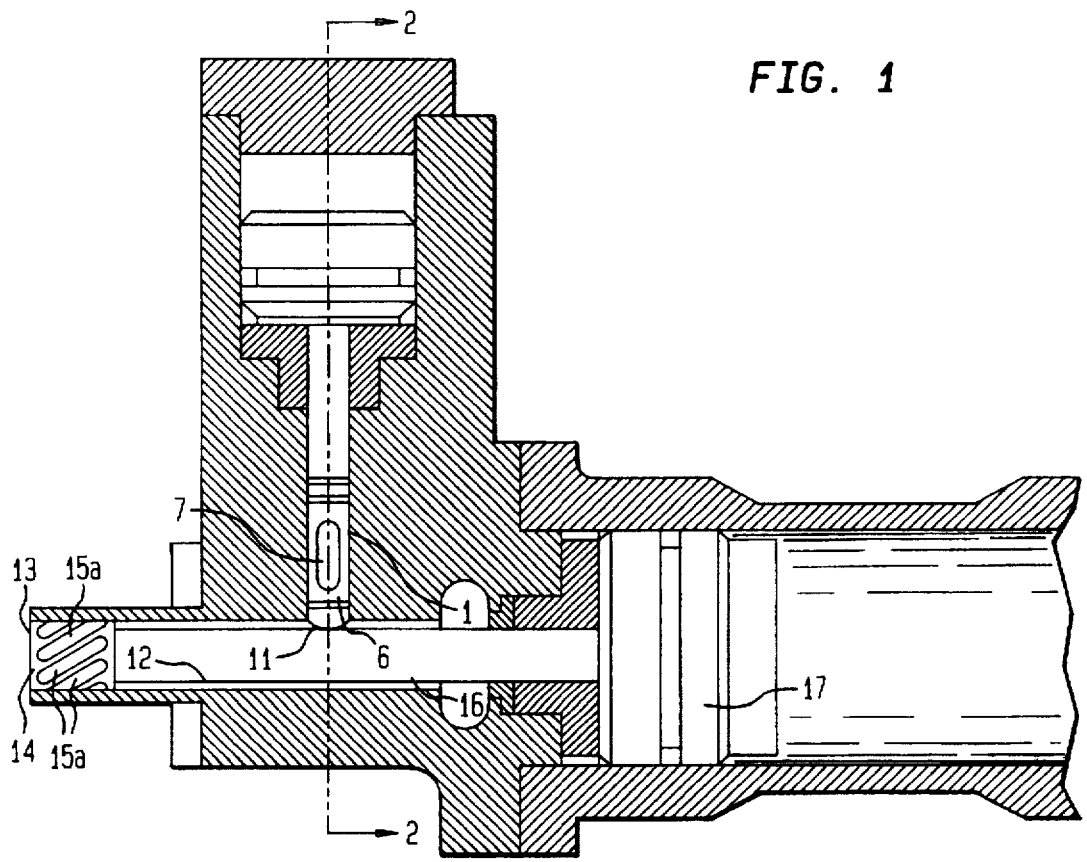
FIG. 1 is a schematic, sectional illustration of a mixing head for mixing of two reactive plastic components.
Figure 2:
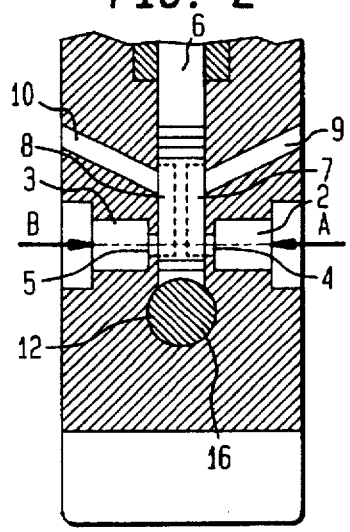
FIG. 2 is the sectional view of the mixing head along the line II—II of FIG. 1.

The illustrated mixing head comprises a cylindrical mixing chamber 1, with a supply line 2 for the plastic component A and a supply line 3 for the plastic component B discharging into said mixing chamber 1. Injection openings 4 and 5 of the supply lines 2 and 3 are controlled in an open and a closed position by a mixing chamber piston 6 which is guided for reversible movement in the mixing chamber 1. The mixing chamber piston 6 is positioned in the recirculating position, in which the plastic components A and B are recirculated via recirculation grooves 7 and 8 formed in the mixing chamber piston 6 to recirculation lines 9 and 10 leading to the components tanks (not shown). In the mixing position (not shown), the mixing chamber piston is positioned in a retracted position where the injection openings 4 and 5 are unblocked, so that the plastic components A and B meet in the mixing chamber 1 under high pressure and are thoroughly mixed therein. The reactive plastic component mixture thus formed flows via the mixing chamber exit opening 11 into the adjoining stabilizing chamber 12 and reaches the form (not shown) via the exit opening 13 in the stabilizing chamber 12.

A cleaning piston 14 is disposed in the stabilizing chamber 12 for reversible movement, with the cleaning piston 14 shown in the drawing in its farthest forward position where at the end of an injection cycle the plastic component mixture is ejected from the stabilizing chamber 12, whereby the inside wall of the stabilizing chamber 12 is almost completely cleaned from the reactive plastic component mixture.

The cleaning piston 14 is fitted tightly in the stabilizing chamber 12 and is on its cylindrical surface area provided with indentations 15a in the form of grooves disposed in a spiral-shaped pattern. The indentations are filled with spacer material (not shown) which may consist of a fully reacted plastic component mixture settling in the indentations after and during the operation and attaching itself thereto. The spacer material may also consist of a separate material applied to the indentations before the installation of the cleaning piston.

The cleaning piston 14 is freely rotatably secured to a piston rod 16 which can be moved back and forth by means of a double-acting hydraulic piston 17. In principle, the pivot bearing may also be disposed between the piston rod and the hydraulic piston 17.

Figure 3:
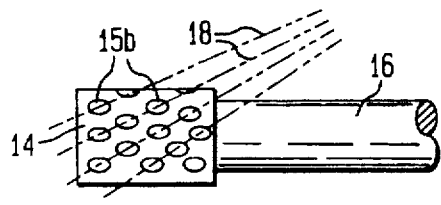
FIG. 3 is a detailed illustration of a cleaning piston having indentations arranged in a spiral pattern which is of a type different from that shown in FIG. 1.

FIG. 3 shows in an enlarged scale a different embodiment of a cleaning piston 14 where the indentations 15b are in the form of dimples arranged in spiral lines 18.

Figure 4:
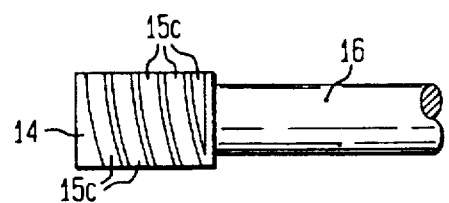
FIG. 4 is a detailed illustration of a cleaning piston having another type of indentations.

FIG. 4 shows in an enlarged scale a cleaning piston 14 with indentations 15c in the form of spiral grooves which have a substantially smaller spiral angle as compared to the spiral grooves of the cleaning piston 14 of FIG. 1. The benefit is that during an axial stroke, a surface line of the inside wall of the stabilizing chamber is traversed multiple times by the overlapping spiral-shaped indentations 15a which are filled with spacer material.

What is claimed is:

1. A device for mixing chemically reactive plastic components under high pressure, comprising:

a mixing chamber receiving at least two chemically reactive plastic components for providing a plastic mixture;

a piston means reciprocating in the mixing chamber for effecting a discharge of remaining plastic mixture;

a stabilizing chamber communicating with the mixing chamber for receiving plastic mixture from the mixing chamber, said stabilizing chamber defining an axis and being so positioned as to adjoin the mixing chamber at an angle; and a cleaning piston reciprocating in the stabilizing chamber for ejection of reactive plastic mixture from the stabilizing chamber, said cleaning piston having an outer surface area formed with indentations which are filled with spacer material and so arranged as to induce a rotational motion of the cleaning piston when the cleaning piston is moved in direction of the axis.

2. The device of claim 1 wherein the stabilizing chamber is oriented at an angle of about 90° relative to the mixing chamber.

3. The device of claim 1 wherein the spacer material is made of a fully reacted plastic mixture.

4. The device of claim 1 wherein the spacer material is made of sealing material applied to the indentations before installation of the cleaning piston.

5. The device of claim 4 wherein the sealing material has a strongly repellent effect with respect to the plastic mixture.

6. The device of claim 1 wherein the indentations are arranged on the surface area in the form of a spiral-shaped pattern.

7. The device of claim 6 wherein the indentations are arranged on the surface area in the form of a continuous spiral.

8. The device of claim 6 wherein the indentations are formed by individual dimples which are lined along respective spiral lines.

9. The device of claim 1, and further comprising a piston rod extending in the stabilizing chamber, said cleaning piston being freely rotatably secured to the piston rod.

10. The device according to claim 1 wherein the mixing chamber and the stabilizing chamber are of cylindrical configuration.

11. The device of claim 1 wherein the indentations are slanted with respect to the axis.

* * * * *